US006749682B2

(12) United States Patent
Mattus

(10) Patent No.: US 6,749,682 B2
(45) Date of Patent: Jun. 15, 2004

(54) CONTROLLING THE SET OF CARBON-FIBER EMBEDDED CEMENT WITH ELECTRIC CURRENT

(75) Inventor: Alfred J. Mattus, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 79 days.

(21) Appl. No.: 10/134,171

(22) Filed: Apr. 29, 2002

(65) Prior Publication Data

US 2003/0200903 A1 Oct. 30, 2003

(51) Int. Cl.[7] .............................................. C04B 40/00
(52) U.S. Cl. ...................................... 106/819; 106/713
(58) Field of Search ................................. 106/819, 713

(56) References Cited

U.S. PATENT DOCUMENTS

| | | | |
|---|---|---|---|
| 4,927,518 | A | 5/1990 | Tauber et al. |
| 5,106,423 | A | 4/1992 | Clarke |
| 5,252,266 | A | 10/1993 | Brabston et al. |
| 5,268,032 | A | 12/1993 | Malone et al. |
| 5,346,547 | A | 9/1994 | McCormack |
| 5,447,564 | A | 9/1995 | Xie et al. |
| 5,916,361 | A | 6/1999 | Molloy et al. |
| 6,254,752 | B1 * | 7/2001 | Miller .......................... 204/515 |

OTHER PUBLICATIONS

Baldwin, K., "Electrically Conductive Concrete Properties and Potential," Construction Canada, vol. 98 (No. 01), p. 28–29, (1998).
Baldwin, K., "Canadians Create Conductive Concrete," Science, p. 1201 (1997).
Tumidajski, P. J., "Electrical Conductivity of Portland Cement Mortars," Cement & Concrete Research, vol. 26 (No. 4), p. 529–534, (1996).

Xie, P. et al, "Electrical Percolation Phenomena in Cement Composites Containing Conductive Fibres," Journal of Materials Science, vol. 31 (No. 15), p. 4093–409, (1996).
Socha, A. et al, "Electrochemical Oxidation of Cyanide Complexes with Copper at Carbon Fibre," Chemistry for the Protection of the Environment 2, Edited by Lucjan Pawlowski, Plenum Press, New York, p. 283–293, (1995).
Steckhan, E. Editor, "Organic Syntheses with Electrochemically Regenerable Redo Systems," Electrochemistry I. Topics in Current Chemistry, Springer–Verlag (New York, NY), p. 1–11, (1987).
No Author Listed, "Polyesters," Ullmann's Encyclopedia of Industrial Chemistry, VCH Publishers, Inc., p. 227–233, (1992).
Dyson, Malcolm G., "A Manual of Organic Chemistry for Advanced Students," Longmans, Green and Co. (New York, NY), p. 539–543, (1950).
Waters, W. A., "Mechanisms of Oxidation of Organic Compounds," Methuen's Monograph on Chemical subjects, John Wiley & Sons, Inc. (New York, NY), p. 99–100, (1964).

* cited by examiner

*Primary Examiner*—Paul Marcantoni
(74) *Attorney, Agent, or Firm*—Kirk A. Wilson

(57) ABSTRACT

A method for promoting cement or concrete set on demand for concrete that has been chemically retarded by adding carbon fiber to the concrete, which enables it to become electrically conductive, sodium tartrate retardant, and copper sulfate which forms a copper tartrate complex in alkaline concrete mixes. Using electricity, the concrete mix anodically converts the retarding tartrate to an insoluble polyester polymer. The carbon fibers act as a continuous anode surface with a counter electrode wire embedded in the mix. Upon energizing, the retarding effect of tartrate is defeated by formation of the polyester polymer through condensation esterification thereby allowing the normal set to proceed unimpeded.

21 Claims, 1 Drawing Sheet

CONTROLLING THE SET OF CARBON-FIBER EMBEDDED CEMENT WITH ELECTRIC CURRENT

The United States Government has rights in this invention pursuant to contract no. DE-AC05-00OR22725 between the United States Department of Energy and UT-Battelle, LLC.

FIELD OF THE INVENTION

The present invention relates to non-electrolytic binders and cements having a retardant admixture to prevent hardening of the binder and more particularly to a method for on-demand control setting of such binders and cements using electrical current to defeat the retardant.

BACKGROUND OF THE INVENTION

Concrete is prepared by mixing cement, water, aggregate, and selected admixtures together to make a workable paste. It is molded or placed as desired, consolidated, and then left to harden. Cement needs moisture to hydrate and cure. The reaction of water with the cement in concrete may continue for many years.

Portland cement consists of five major compounds and a few minor compounds. The composition of a typical Portland cement is:

| Cement Compound | Weight Percentage | Chemical Formula |
| --- | --- | --- |
| Tricalcium silicate | 50% | $Ca_3SiO_5$ or $3CaO.SiO_2$ |
| Dicalcium silicate | 25% | $Ca_2SiO_4$ or $2CaO.SiO_2$ |
| Tricalcium aluminate | 10% | $Ca_3Al_2O_6$ or $3CaO.Al_2O_3$ |
| Tetracalcium aluminoferrite | 10% | $Ca_4Al_2Fe_2O_{10}$ or $4CaO.Al_2O_3.Fe_2O_3$ |
| Gypsum | 5% | $CaSO_4.2H_2O$ |

When water is added to cement, each of the compounds undergoes hydration and contributes to the final concrete product. Only the calcium silicates contribute to strength. Tricalcium silicate is responsible for most of the early strength (first 7 days). Dicalcium silicate, which reacts more slowly, contributes only to the strength at later times.

The equation for the hydration of tricalcium silicate is given by:

Tricalcium silicate+Water→Calcium silicate hydrate+Calcium hydroxide+heat $$2Ca_3SiO_5 + 7H_2O \rightarrow 3CaO \cdot 2SiO_2 \cdot 4H_2O + 3Ca(OH)_2 + 173.6 \text{ } kJ$$

Upon the addition of water, tricalcium silicate rapidly reacts to release calcium ions, hydroxide ions, and a large amount of heat. The pH of the pore water quickly rises to over 12 because of the release of alkaline hydroxide ($OH^-$) ions. This initial hydrolysis slows down quickly after it starts resulting in a decrease in heat evolved.

The reaction slowly continues producing calcium and hydroxide ions until the system becomes saturated. Once this occurs, the calcium hydroxide starts to crystallize. Simultaneously, calcium silicate hydrate begins to form. Ions precipitate out of solution accelerating the reaction of tricalcium silicate to calcium and hydroxide ions (Le Chatelier's principle). The evolution of heat is then dramatically increased.

Dicalcium silicate also affects the strength of concrete through its hydration. Dicalcium silicate reacts with water in a similar manner compared to tricalcium silicate, but much more slowly. The heat released is less than that by the hydration of tricalcium silicate because the dicalcium silicate is much less reactive. The products from the hydration of dicalcium silicate are the same as those for tricalcium silicate:

Dicalcium silicate+Water→Calcium silicate hydrate+Calcium hydroxide+heat $$2Ca_2SiO_4 + 5H_2O \rightarrow 3CaO \cdot 2SiO_2 \cdot 4H_2O + Ca(OH)_2 + 58.6 \text{ } kJ$$

The other major components of Portland cement, tricalcium aluminate and tetracalcium aluminoferrite also react with water. Their hydration chemistry is more complicated as they involve reactions with the gypsum as well. Gypsum is added to slow or retard tricalcium aluminate hydration. Oil field cements contain a small amount of gypsum.

Heat is evolved with cement hydration. This is due to the breaking and making of chemical bonds during hydration. The heat generated is shown in FIG. 1 as a function of time. Stage I hydrolysis of the cement compounds occurs rapidly with a temperature increase of several degrees. Stage II is known as the dormancy period. The evolution of heat slows dramatically in this stage. The dormancy period can last from one to three hours. During this period, the concrete is in a plastic state which allows the concrete to be transported and placed without any major difficulty. This is particularly important for the construction trade who must transport concrete to the job site. It is at the end of this stage that initial setting begins. In stages III and IV, the concrete starts to harden and the heat evolution increases due primarily to the hydration of tricalcium silicate. Stage V is reached after approximately 36 hours. The slow formation of hydrate products occurs and continues as long as water and unhydrated silicates are present.

Water-reducing and set-controlling admixtures are classified by ASTM C 494 into seven types:

1. Water-reducing
2. Retarding
3. Accelerating
4. Water-reducing and retarding
5. Water-reducing and accelerating
6. Water-reducing, high-range
7. Water-reducing, high-range, and retarding The materials that generally are available for use as water-reducing and set-controlling admixtures fall into one of eight general classes:

1. Lignosulfonic acids and their salts
2. Modifications and derivatives of lignosulfonic acids and their salts
3. Hydroxylated carboxylic acids and their salts
4. Modifications and derivatives of hydroxylated carboxylic acids and their salts
5. Salts of the sulfonated melamine polycondensation products
6. Salts of the high molecular weight condensation product of naphthalene sulfonic acid
7. Blends of naphthalene or melamine condensates with other water-reducing or set-controlling materials, or both
8. Other materials, which include: (a) inorganic materials, such as zinc salts, borates, phosphates, chlorides; (b)

amines and their derivatives; (c) carbohydrates, polysaccharides, and sugar acids; and (d) certain polymeric compounds, such as cellulose-ethers, melamine derivatives, naphthalene derivatives, silicones, and sulfonated hydrocarbons.

These materials may be used singly or in combination with other organic or inorganic, active, or essentially inert substances to control cement set.

Many of the admixtures used for specific purposes in concrete are used as grouting admixtures to impart special properties to the grout. Oil-well cementing grouts encounter high temperatures and pressures with considerable pumping distances involved. Grout for preplaced aggregate concrete requires extreme fluidity and nonsettling of the heavier particles. Nonshrink grout requires a material that will not exhibit a reduction from its volume at placement. A wide variety of special purpose admixtures are used to obtain the special properties required.

For oil-well cementing grouts, retarders are useful in delaying setting time. Bentonite clays may be used to reduce slurry density, and materials such as barite and iron filings may be used to increase the density. Tile grouts and certain other grouts use materials such as gels, clays, pregelatinized starch, and methyl cellulose to prevent the rapid loss of water. It is standard procedure to add more retardant than is actually needed to allow enough time for placing the grout, sometimes up to 20,000 feet deep in a well to avoid set problems. This procedure sometimes results in a loss over the control of the set, either the set is too rapid due to complex chemistry down hole, or set does not occur as planned requiring waiting days at sometimes millions of dollars of cost per day.

Binders or cements which require electrolytic reactions and acidic conditions to harden are well known in the prior art. For example, a zinc phosphate hydrate cement is produced by combining a metal oxide zinc powder with an acid such as phosphoric acid. When these two components are intermixed, rapid setting occurs and a high quality zinc hydrate cement will be formed.

U.S. Pat. No. 5,252,266 to Brabston et al. teaches electric current induced hardening of binders and cements that rely on electrolysis to effect a pH change around either the cathode or anode thereby changing the surrounding salts to a pH bindable with metal oxides or other additives.

U.S. Pat. No. 5,268,032 to Malone et al. also relies on electrolysis to form an acid or base that reacts with metal oxide to initiate formation of a metal oxide phosphate. Fibers are used to add flexural and tensile strength.

Although these prior art cements have found wide acceptance, they possess certain drawbacks in practical application. Conventional methods require mixing of the cement components prior to placement within a suitable mold. As a result, the intermixed components tend to "set" prior to completion of the molding process. This premature hardening of the cement often results in a flawed product or clogged and damaged equipment. In addition, the rapid setting characteristic of the cement requires that all the mixing equipment be fully and completely cleaned immediately after transfer of the cement to the mold.

A disadvantage of electrolytic acid-setting binders and cements is the need to prepare in advance the strong acid for addition to the metal oxide powder. Handling and preparation of such acids can be hazardous and requires great care on the part of the user. Further, articles produced with conventional acid-setting binders or cements are restricted by the type and number of filler materials which can be employed. Time constraints in terms of mixing and the need to avoid premature setting often make the inclusion of fillers within a finished product impractical or will yield a product of inferior quality.

Even though electrolytic acid-setting cements and binders have found wide acceptance within the construction and molding industries, the uncontrolled speed and time at which they set has restricted their expansion into other technologies. A need has therefore existed within the art for non-electrolytic cements or binders which can be controllably hardened on-demand and in so doing avoid the aforementioned problems. These new methods do not rely on electrolysis to initiate chemical set.

BRIEF SUMMARY OF THE INVENTION

A simple means for promoting cement or concrete set on demand that has been chemically retarded with sodium tartrate, a retarder often used in the drilling industry and other construction. One embodiment of the invention adds 3% carbon fiber to the concrete, which enables it to become electrically conductive, 3% sodium tartrate retardant, and copper sulfate which forms a soluble copper tartrate complex in alkaline concrete mixes. Using electricity, the concrete mix anodically converts the retarding tartrate to an insoluble polyester polymer inside the cement pores. The carbon fibers act as a continuous anode surface with a counter electrode wire embedded in the mix. Upon energizing for 2 to 3 hours, the retarding effect of tartrate is defeated by formation of the polyester polymer through condensation esterification thereby allowing the normal set to proceed unimpeded.

Accordingly, it is an advantage of the present invention to provide a method for the controlled hardening of an alkaline-setting concrete thereby preventing premature setting, flaws within the item being cast and clogged or damaged mixing equipment.

Another advantage of the present invention is to provide a method for setting a concrete whereby an alkaline concrete with an electrically conductive admixture is produced in situ thereby eliminating the need for the preparation of a separate acid solution for mixing with the metal oxide cement.

Still another advantage of the present invention is to provide a method for the controlled hardening of an alkaline-setting concrete whereby the mold itself is an operating electrochemical cell.

A still further advantage of the present invention is to provide a method for hardening alkaline-setting concrete and binders whereby the molded end product contains various admixtures.

A still further advantage of the present invention is to provide a method for the controlled hardening of alkaline-setting concretes or grouts whereby the components for producing the alkaline-setting cement are uniformly mixed prior to hardening so as to provide a high quality end product.

Another advantage of the present invention is to provide a method for the controlled hardening of alkaline-setting concrete regardless of ambient temperature.

Further and other advantages of the present invention will become apparent from the description contained herein, read together with the attached claims and figures.

DETAILED DESCRIPTION OF THE INVENTION

Figure 1:
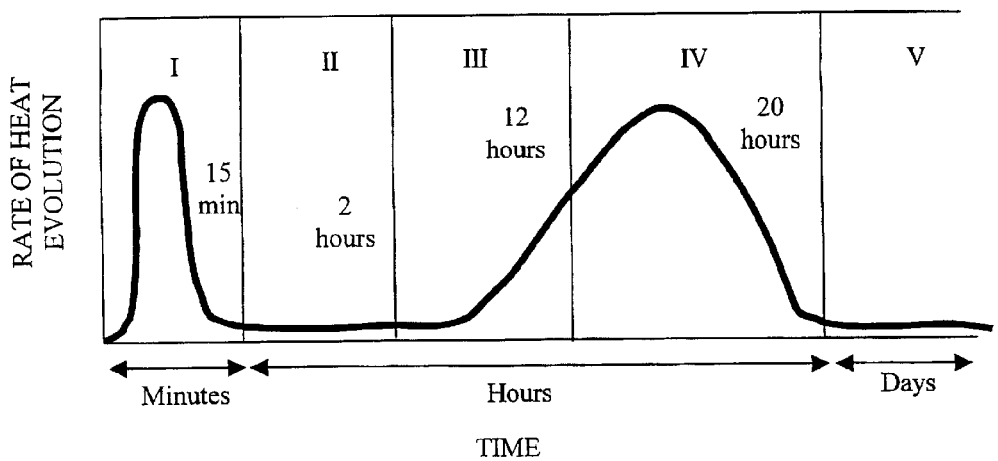
FIG. 1 is a graph of heat evolved from setting cement versus time.

According to one embodiment of the present invention, the method for controlling the hardening of an alkaline-setting cement causes an effective organic which can retard cement, such as tartrate, to be oxidized by a tartrate complex. The result of oxidation of the tartrate is changed in the presence of a diol to form a long polymer, or polyester, which itself cannot retard cement or concrete. Electrolysis is not relied upon to set the concrete. Instead, cyclic oxidation of $Cu^{II}$ acts to oxidize tartrate and form $Cu^{I}$ which is then reoxidized cyclically back to $Cu^{II}$ at the anode. Catalytic oxidation by $Cu^{II}$ in the presence of tartrate and diol result in the formation of a polyester if formed from tartrate thereby becoming a long chain polymer that is ineffective as a retardant. This invention works for both cement and concrete. Concrete as defined herein is cement, such as Portland cement, plus any aggregate.

Prior methods use an acid or base generated by electrolysis to cause acids to form, such as $PO_4 \rightarrow H_3PO_4$, which reacts with metal oxide to initiate formation of a metal oxide phosphate. These mixtures use an electrolyte to cause the paste solution to become electrically conductive. The instant invention relies primarily on electrically conductive carbon fibers in three dimensions to act as anodic (+) surfaces and counter electrodes, or cathodic (−) surfaces as in an electrolytic cell, throughout the paste thereby rendering the entire paste conductive. Some fibers form anodic paths throughout the paste while some form cathodic depending upon internal random contact inside the paste.

Other organic set retarders can be polymerized, degraded or changed so as to function like tartaric acid or its sodium salt and become a set controller. Examples of these retarders are: Na or Ca-based lignosulfonates, carbohydrates and their derivatives, citric acid, mucic acid, gluconic acid, salicyclic acid, heptonic acid, malic acid, tannic acid and saccharic acid and all their respective salt forms.

EXAMPLE 1

Beaker

Beaker experiments mixed an alkaline solution, approximately pH 13, with sodium hydroxide, and in the presence of copper II complexed by the tartrate itself (added as copper sulfate salt), the solution anodically oxidized the tartrate to insoluble polyester fibers throughout the solution.

The white, insoluble fibers grew densely over two to three hours of energizing from anodic fiber surfaces out into the solution. A power supply provided approximately 5 volts DC and 0.1 amps to the anode and steel cathode arrangement. Fortafil® brand polyacrylonitrile (PAN) based carbon fibers were used to conduct electric current throughout. Other polymer precursors, not just PAN, can be used to make carbon fibers provided that the resulting fibers remain electrically conductive. Preferably, the outer coating on the carbon fiber, sometimes referred to as "sizing", is removed using acetone or other suitable solvent prior to being used in the invention. Conductivity between the fibers is enhanced with the sizing removed. Removal of the sizing is not essential to the invention. Samples of the tartrate solution were analyzed in time to show its removal from solution with white strings of polyester forming throughout the solution.

EXAMPLE 2

Cement

It was found that by adding 3% chopped, electrically conductive carbon fiber to dry cement and blending and hydrating with approximately 45% water that the resulting hardened mass becomes electrically conductive.

This then allows the fiber inside the cement to act as a series of random anodic and cathodic surfaces which can facilitate the oxidation of tartrate in pore solution to an insoluble polyester near or at anodic fibers. This electrical conductivity then opened the door to using the chemical system inside cement.

This set retarder, sodium tartrate in the cement pore solution, prevents the cement paste from hardening. It is well known that dicarboxylic acids (tartrate) are used in industry to form condensation esterification reactions when reacted with a diol (di-alcohol). This diol could be added as, for example, ethylene glycol or an intermediate from the tartrate. In this case, the tartrate is decarboxylated (loses its COO groups) and forms an intermediate diol with two OH groups which serve this function.

Water was made alkaline and sodium tartrate dissolved in it. Copper sulfate was added such that one mole of copper was present per mole of tartrate (this much may not really be needed) and the tartrate complexed the copper to prevent precipitation at pH 13. Cement containing 3% added carbon fiber from Akzo Nobel of Rockwood, Tenn., was mixed in with the dry cement and then a paste was formed by adding the tartrate-copper-containing water. This paste was placed in a plastic cup with a metal tube in the center to act as a central anode (+) which made contact with fibers internally. A steel wire was placed into the paste as the counter electrode thereby serving as the cathode (−) and causing some fibers contacting it to become cathodic (−). The two electrodes were connected to a DC power supply and energized for 2 to 3 hours at 5 volts DC and approximately 0.1 amperes. The electrodes were removed from the soft paste. The quadrant between the central anode and the cathode wire became hard (>10,000 psi penetration resistance) within 18 hours while the other areas remained soft. The higher electrical potential between anode and cathode permitted the tartrate to be destroyed as a viable set retarder (converted to polymer) and this permitted the normal hydration reaction (which is fast when cement is not retarded) to proceed normally. The other areas were still chemically retarded. In short, the small pores inside the cement pastes function as small beakers as described above in which tartrate is polymerized at carbon fibers passing through, using electro-anodic oxidation of the organic tartrate set retarder by way of the $Cu^{I}/Cu^{II}$ tartrate complex intermediate.

Figure 2:
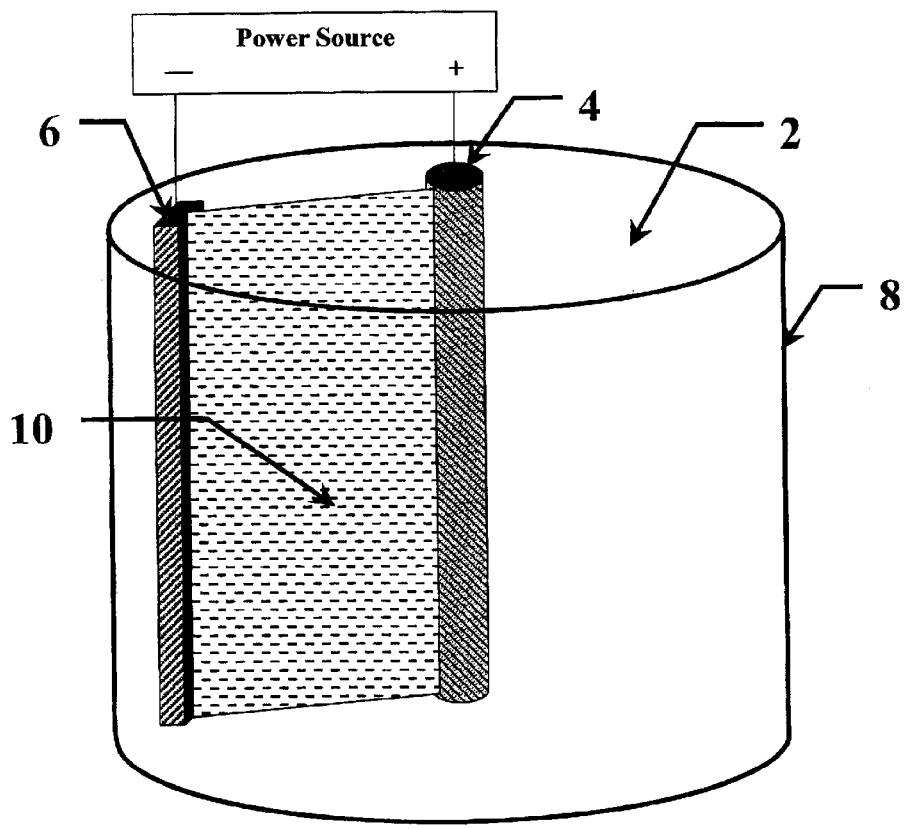
FIG. 2 is an illustration of controlled set of concrete slurry using electrical current.

FIG. 2 illustrates one embodiment of the invention wherein a set-retarded conductive concrete 2 comprising admixtures and carbon fibers is held in a non-conductive container 8. An anode 4 and cathode 6 are at least partially submerged in the set-retarded concrete 2. A voltage is placed across the anode 4 and cathode 6 such that electric current is passed through the conductive concrete 2 thereby defeating the set-retardant in the set area 10 and allowing the concrete to set only in the set area 10. Concrete outside of the set area 10 remains in a slurry until setting is demanded.

The process is conceived to work with other dicarboxylic acids which are known to retard set. The addition of small amounts of diol, such as ethylene glycol or other di-alcohols, is conceived to speed the condensation esterification reaction substantially thereby lowering power consumption and time to completely polymerize. Alternating current (AC) is conceived to work, when rectified to direct current (DC).

For those organic set retarders which do not contain carboxylic acid groups which would permit them to be polymerized as esters, it would be useful to add these functional groups to them (such as lignosulfonates) and make them amenable to use in the process of this invention.

One preferred embodiment of the invention is intended to use this process down-hole in wells when drilling on land or at sea. Also, civil engineering construction especially when rebar is present to function as a counter electrode, is another embodiment. Heavily retarded cement or concrete can be made to remain as a slurry for weeks or months and transported to places which take a lot of time and then use this technology to neutralize the retarder. Massive amounts of concrete put in place could be made to set in phases so that too much heat is not liberated at once. Sections can be controlled set in any sequence when ready. The technology may apply to use with other retarded hydraulic materials other than cement.

Applicant's have discovered that the electrochemical reaction which takes place within the slurry or paste can be activated on-demand for chemically retarded grout or concrete containing cement by adding carbon fiber, which enables it to become electrically conductive, containing sodium tartrate retardant, and copper sulfate which forms a copper tartrate complex in the alkaline slurries. Using electricity, the cement or concrete mix anodically converts the retarding tartrate to an insoluble polyester polymer. The carbon fibers act as a continuous anode surface with a counter electrode wire embedded in the mix elsewhere, with fibers contacting the counter electrode becoming cathodic fibers. Upon energizing, the retarding effect of tartrate is defeated by formation of the polyester polymer through condensation esterification thereby allowing the normal set to proceed unimpeded.

When an electrical current is established between the electrodes, with electrical conduction promoted by the carbon fibers, positively charged ions move towards the cathode electrode while negatively charged ions move toward the anode electrode. The electric current is carried through the fibers and electrolyte by this migration of ions and serves to cause chemical change. More importantly for the present invention, there are produced at the positive electrode or anode, at the carbon fiber surfaces, an insoluble polyester polymer that defeats the retarding effect of tartrate.

The rate at which the current is applied is not critical since it is the total current applied which determines the amount of polymer generated. Applicant's have found that both metal and non-metal (carbon) electrodes work equally well. Preferably, the carbon fiber should not be coated with sizing or other less conductive coatings added by the fiber manufacturer.

A variety of aggregates or fillers may be added to slurry. Preferred aggregates and fillers include sand, clay, ground ceramics and glasses. The flexural or tensile strength of the hardened cement can be increased by the addition of non-carbon fibers, woven fabrics or other material which is not readily subject to attack. The carbon fibers used in the examples herein actually increased the tensile strength and other physical properties of the final hardened mass. Preferred fibers are generally spun or extruded glasses or silicas or synthetic organic fibers and plastics. The present invention is not limited to a particular group of aggregates and fillers but is intended to encompass the variety of such additives as is generally known in the art.

It is within the scope of the present invention to provide a method for controllably hardening and strengthening of loose and granular material such as soil or gravel into a cohesive mass. In this embodiment, the fiber-containing slurry is uniformly pumped or otherwise injected and intermixed with the granular material. After positioning electrodes within the mass, a current is applied and the retardant in the mixture is defeated. In this way, premature setting is avoided and the slurry completely fills the intergranular spaces of the soil or gravel prior to hardening. In addition, the electrodes can serve after hardening as reinforcing or attachment points.

While there has been shown and described what are at present considered the preferred embodiments of the invention, it will be obvious to those skilled in the art that various changes and modifications can be made therein without departing from the scope.

I claim:

1. A method for the controlled hardening of alkaline-setting binders and cements comprising the steps of:
   a) placing an alkaline-setting cement in a mold or container;
   b) mixing with the cement a retardant, alkaline water, salt, and conductive fibers to form a slurry; and
   c) subjecting the slurry to electric current for a period of time until said retardant is rendered ineffective whereby a hardened article is produced.

2. The method according to claim 1 wherein said alkaline-setting cement further comprises at least one composition selected from the group consisting of Portland, slag, glass, fired clay, fly ash, and glassy metallurgical waste.

3. The method according to claim 1 wherein said retardant further comprises at least one composition is selected from the group consisting of sodium tartrate, a lignosulfonate containing sodium, a lignosulfonate containing calcium, a carbohydrate, a carbohydrate derivative, citric acid, mucic acid, gluconic acid, salicyclic acid, heptonic acid, malic acid, tannic acid, saccharic acid, and salt forms thereof.

4. The method according to claim 1 wherein said alkaline water is a mixture of sodium hydroxide and water.

5. The method according to claim 1 wherein said salt is selected from the group consisting of copper sulfate and all water soluble copper salts.

6. The method according to claim 1 wherein said conductive fibers further comprise at least one material selected from the group consisting of glass, silica, plastic, polyacrylonitrile, pitch, and their derivatives.

7. The method according to claim 1 including the additional step prior to the subjecting step of:
   adding a filler material to said slurry, the filler being selected from the group consisting of sand, limestone, clay, ceramic particles, glass particles, silica fibers, cloth fibers, plastic fibers and plastic granules.

8. The method according to claim 1 wherein the mold is associated with an electrolytic cell having at least one anode electrode and one cathode electrode.

9. The method according to claim 8 wherein the mold is a shaped cathode or anode structure having an anode or cathode positioned therein.

10. The method according to claim 8 wherein said electrodes are ferrous or non-ferrous metals and alloys thereof.

11. A method for the controlled hardening and strengthening of oil-well cementing grouts comprising the steps of:
   a) adding an alkaline-setting binder or cement to water to form a slurry;
   b) mixing with said slurry a retardant, alkaline water, salt, and conductive fibers to form an electrically conductive grout;
   c) injecting said grout down-hole to uniformly encase the annular space surrounding the oil-well casing; and d) subjecting the grout to electric current for a period of time until said retardant is rendered ineffective whereby a hardened article encases said casing.

12. The method according to claim 11 wherein said alkaline-setting cement further comprises at least one composition selected from the group consisting of Portland, slag, glass, fired clay, fly ash, and glassy metallurgical waste.

13. The method according to claim 11 wherein said retardant further comprises at least one composition selected from the group consisting of sodium tartrate, a lignosulfonate containing sodium, a lignosulfonate containing calcium, a carbohydrate, a carbohydrate derivative, citric acid, mucic acid, gluconic acid, salicyclic acid, heptonic acid, malic acid, tannic acid, saccharic acid, and salt forms thereof.

14. The method according to claim 11 wherein said alkaline water is a mixture of sodium hydroxide and water.

15. The method according to claim 11 wherein said salt is selected from the group consisting of copper sulfate and all water soluble copper salts.

16. The method according to claim 11 wherein said conductive fibers further comprise at least one material selected from the group consisting of glass, silica, plastic, polyacrylonitrile, pitch, and their derivatives.

17. The method according to claim 11 including the additional step prior to the subjecting step of:

adding a filler material to said slurry, the filler being selected from the group consisting of sand, limestone, clay, ceramic particles, glass particles, silica fibers, cloth fibers, plastic fibers and plastic granules.

18. The method according to claim 11 wherein the well casing is associated with an electrolytic cell having at least one anode electrode and one cathode electrode.

19. The method according to claim 18 wherein the well casing is the anode electrode and a cable or wire embedded in said grout is the cathode electrode.

20. The method according to claim 18 and including the step of:

moving the anode within the mold to provide localized hardening of the cement or binder in a predetermined location.

21. The method according to claim 18 wherein said electrodes are ferrous or non-ferrous metals and alloys thereof.

* * * * *